United States Patent [19]

Parejo

[11] Patent Number: 5,570,763
[45] Date of Patent: Nov. 5, 1996

[54] SUSPENSION STRUT

[75] Inventor: Manuel Parejo, Cadiz, Spain

[73] Assignee: Delphi Automotive Systems Espana S.A., Cadiz, Spain

[21] Appl. No.: 374,461

[22] Filed: Jan. 18, 1995

[30] Foreign Application Priority Data

Apr. 15, 1994 [GB] United Kingdom ............... 9407464

[51] Int. Cl.⁶ .................................................. F16F 9/00
[52] U.S. Cl. ........................ 188/322.22; 188/315
[58] Field of Search ............................ 188/311, 322.15, 188/322.16–322.19, 322.22, 282, 284, 289; 267/64.15, 35; 92/219, 222, 255, 256

[56] References Cited

U.S. PATENT DOCUMENTS

| | | | |
|---|---|---|---|
| 3,724,615 | 4/1973 | Stormer | 188/322.22 |
| 3,763,970 | 10/1973 | Anderson | 188/322.15 |
| 4,114,735 | 9/1978 | Kato | 188/282 |
| 4,747,475 | 5/1988 | Hagwood et al. | 188/322.15 |
| 4,834,222 | 5/1989 | Kato et al. | 188/322.22 |
| 4,838,393 | 6/1989 | Mourray et al. | 188/322.17 |
| 4,934,667 | 6/1990 | Pees et al. | 267/64.21 |
| 4,971,181 | 11/1990 | Zaenglein et al. | 188/322.15 |
| 4,988,081 | 1/1991 | Dohrmann | 188/322.22 |
| 5,038,897 | 8/1991 | Wells et al. | 188/311 |
| 5,174,603 | 12/1992 | Lund | 280/772 |
| 5,324,085 | 8/1993 | Schneider | 188/322.15 |

FOREIGN PATENT DOCUMENTS

| | | |
|---|---|---|
| 0259010 | 3/1988 | European Pat. Off. . |
| 887191 | 1/1962 | United Kingdom . |
| 2107821 | 5/1983 | United Kingdom . |
| WO84/01198 | 3/1984 | WIPO . |
| WO91/00186 | 1/1991 | WIPO . |

*Primary Examiner*—Robert J. Oberleitner
*Assistant Examiner*—Chris Schwartz
*Attorney, Agent, or Firm*—Jeffrey A. Sedlar

[57] ABSTRACT

A suspension strut comprising a tube substantially closed at both ends and containing fluid; a piston assembly slidably mounted in the tube and making a sealing fit therewith, the piston assembly separating a compression chamber and a rebound chamber within the tube; a piston rod attached to the piston assembly and extending through the rebound chamber and out of one end of the tube; and a rebound stop mounted on the piston rod between the piston assembly and one end of the tube, the rebound stop comprising a substantially rigid ring and an annular bumper, wherein the rebound stop is engageable with one end of the tube and with the piston assembly.

10 Claims, 2 Drawing Sheets

SUSPENSION STRUT

BACKGROUND OF THE INVENTION

The present invention relates to a suspension strut or damper for a motor vehicle.

Known suspension struts comprise a tube; a piston sealably slidably mounted in the tube and attached to a piston rod, the piston separating a compression chamber from a rebound chamber within the tube; a compression stroke valve mounted on the piston; and a rebound stroke valve mounted on the piston. The compression stroke valve acts as a one way valve to allow flow of fluid from the compression chamber to the rebound chamber through one or more compression flow passages in the piston during the compression stroke of the suspension strut. The rebound stroke valve acts as a one way valve which allows flow of fluid from the rebound chamber to the compression chamber through one or more rebound flow passages in the piston during the rebound stroke of the suspension strut. The piston rod extends out of the tube at one end thereof, and is sealably slidably mounted in that one end. A rebound stop is attached to the piston rod between the piston and the one end of the tube. The rebound stop limits the movement of the piston towards the one end of the tube during the rebound stroke of the suspension strut. Typically, the rebound stop comprises a rigid metal ring which is secured to the piston rod on the piston side of the rebound stop, and an annular bumper of elastomeric material which is engageable with the one end of the tube. The metal ring is secured to the piston rod by machining a circumferential groove in the rod and crimping the ring into the groove or positioning a washer or other appropriate means in the groove to retain the ring. This arrangement has the disadvantage that it is difficult to assemble the rebound stop to the piston rod when it is a requirement that the rebound stop be positioned adjacent to, or close to, the piston, especially when the piston is attached to the piston rod by welding.

SUMMARY OF THE INVENTION

It is an object of the present invention to provide a suspension strut which overcomes the above mentioned disadvantage.

The present invention is particularly for a suspension strut comprising an inner tube and an outer tube (sometimes referred to as a twin tube damper) in which the piston slides in the inner tube, although the invention may also be used in a suspension strut having a single tube (sometimes referred to as a monotube damper).

A suspension strut in accordance with the present invention comprises a tube substantially closed at both ends and containing fluid; a piston assembly slidably mounted in the tube and making a sealing fit therewith, the piston assembly separating a compression chamber and a rebound chamber within the tube; a piston rod attached to the piston assembly and extending through the rebound chamber and out of one end of the tube; and a rebound stop mounted on the piston rod between the piston assembly and said one end of the tube, the rebound stop comprising a substantially rigid ring and an annular bumper, wherein the rebound stop is engageable with said one end of the tube and with the piston assembly.

With the present invention, there is no need to rigidly secure the rigid ring to the piston rod which overcomes the disadvantage specified above regarding prior known arrangements. The present invention has the additional advantages that it is no longer necessary to machine a groove in the piston rod, that it is easier to assemble the rebound stop on the piston rod, and that it is possible to use a material other than metal for the rigid ring.

BRIEF DESCRIPTION OF THE DRAWINGS

The present invention will now be described, by way of example, with reference to the accompanying drawings, in which.

DETAILED DESCRIPTION OF THE PRESENTLY PREFERRED EMBODIMENT

Figure 1:
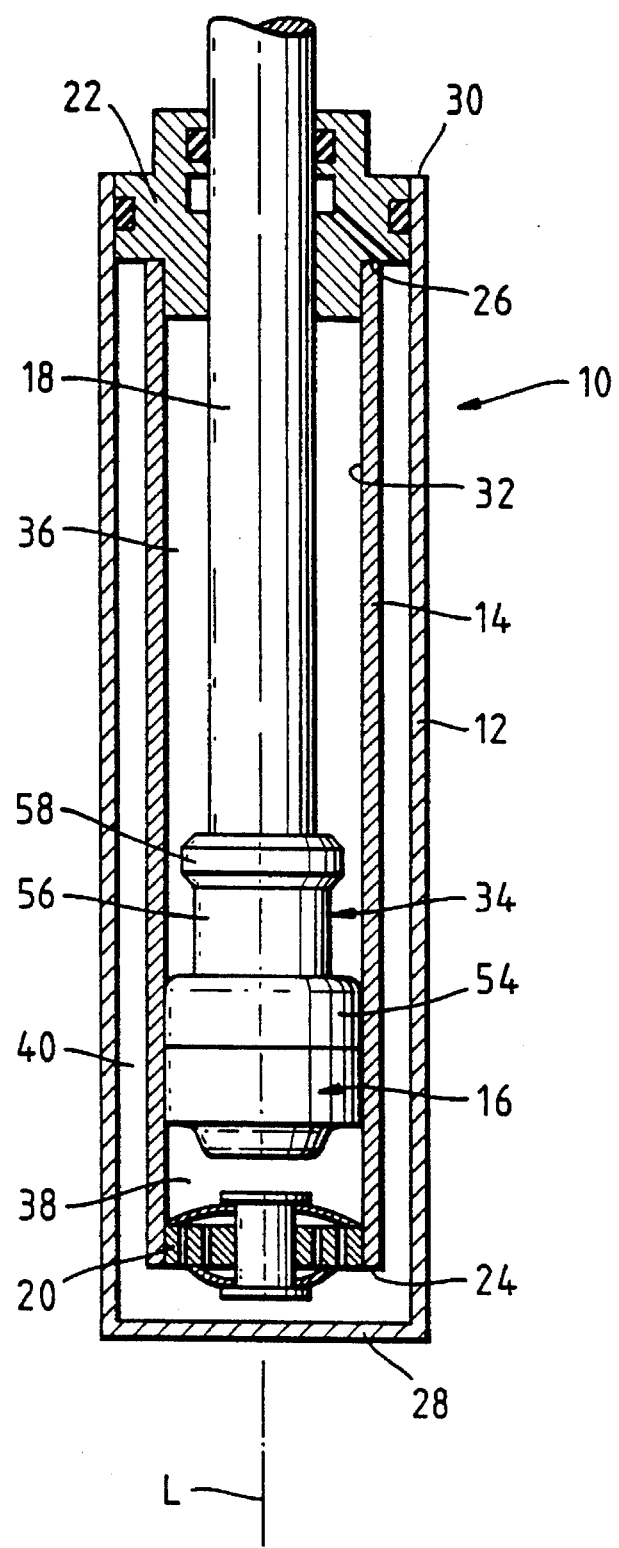
FIG. 1 is a cross-sectional view of a suspension strut in accordance with the present invention.

Referring to the drawings, the suspension strut 10 shown in FIG. 1 is of the twin tube damper type, and comprises an outer tube 12, an inner tube 14 substantially coaxial with the outer tube on an axis L, a piston assembly 16, a piston rod 18 having a longitudinal axis on axis L, a compensation valve 20, a rod guide 22, and a rebound stop 34. The compensation valve 20 and the rod guide 22 may be any suitable conventional design well known to those skilled in the art, and will not be described in detail. The piston assembly 16 may also be of any suitable conventional design well known to those skilled in the art, and the arrangement shown in FIG. 1 will be described in greater detail below. The rebound stop 34 of the present invention will also be described below in greater detail.

The inner tube 14 is substantially closed at one end 24 by the compensation valve 20, and is substantially closed at the other end 26 by the rod guide 22. The outer tube 12 is closed at one end 28 by an integral formation of the outer tube walls, and is substantially closed at the other end 30 by the rod guide 22. The piston rod 18 extends through, and makes a sealing sliding fit with, the rod guide 22. The piston assembly 16 makes a sealing sliding fit with the inner surface 32 of the inner tube 14 and is secured to one end of the piston rod 18 by welding. The piston assembly 16 divides the inner area of the inner tube 14 into a rebound chamber 36 and a compression chamber 38. The area between the inner tube 14 and the outer tube 12 defines a compensation chamber 40. The rebound and compression chambers 36 and 38 are substantially filled with fluid to damp reciprocating movement of the piston assembly 16 and piston rod 18 along axis L relative to the outer and inner tubes 12 and 14. The compensating chamber 40 is partly filled with fluid and acts as a reservoir for the fluid in the rebound and compression chambers 36 and 38. The suspension strut 10 is mounted in a motor vehicle (not shown) in any standard manner.

Figure 2:
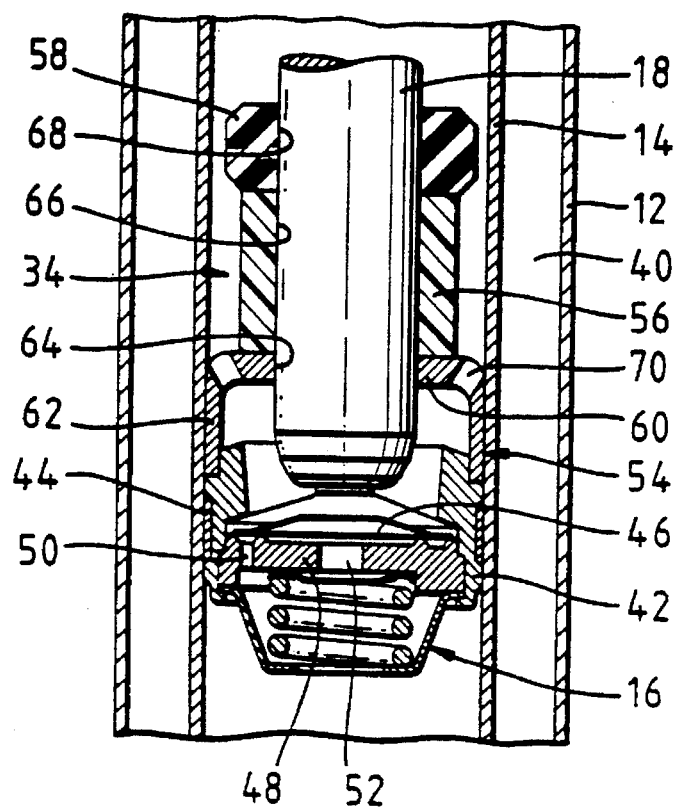
FIG. 2 is an enlarged cross-sectional view of the piston assembly and rebound stop of the suspension strut of FIG. 1.

The piston assembly 16 is shown in greater detail in FIG. 2 and comprises a piston 42 of sintered steel, an annular seal 44 made from Teflon® material, a compression stroke valve 46, and a rebound stroke valve 48. The compression stroke valve 46 acts as a one way valve to allow flow of fluid from the compression chamber 38 to the rebound chamber 36 through one or more compression flow passages 50 in the piston 42 during the compression stroke of the suspension strut 10. The rebound stroke valve 48 acts as a one way valve which allows flow of fluid from the rebound chamber 36 to the compression chamber 38 through a rebound flow passage 52 in the piston 42 during the rebound stroke of the suspension strut 10.

The rebound stop 34 comprises a substantially rigid ring 54, an annular spacer 56, and an annular resilient bumper 58, as can be seen in better detail in FIG. 2. The rebound stop 34 is positioned on the piston rod 18 between the piston assembly 16 and the rod guide 22. The annular spacer 56, which is optional, is positioned between the rigid ring 54 and the bumper 58, and is preferably formed of plastics material. The annular resilient bumper 58 is positioned on the side of the rebound stop 34 directed towards the rod guide 22, and is preferably formed of elastomeric material. The rigid ring 54 is substantially U-shaped in cross-section and comprises an annular base portion 60 and an integral annular wall portion 62. The annular base portion 60 is positioned adjacent the spacer 56 (or the bumper 58 if the spacer is not present), and the wall portion 62 extends away from the bumper 58, that is, the wall portion is directed towards the piston assembly 16. The rebound stop 34 is assembled on the piston rod 18 simply by passing the piston rod through substantially central openings 64, 66, 68 in the base portion 60, spacer 56, and bumper 58 respectively. The central openings 64, 66, 68 are sized such that the rigid ring 54, the spacer 56, and the bumper 58 make a close sliding fit on the piston rod 18. This removes the need to machine a groove on the piston rod, and simplifies the assembly process relative to previously known arrangements. Passages 70 are preferably formed through the base portion 60 to allow passage of fluid during rebound and compression strokes of the suspension strut 10.

In use, during a rebound stroke of the suspension strut 10, the bumper 58 is engageable with the rod guide 22, and the wall portion 62 of the rigid ring 54 is engageable directly with the piston 42 of the piston assembly 16 to limit the movement of the piston assembly relative to the inner and outer tubes 14 and 12 such that rebound forces pass directly to the piston. The limit of this movement can be adjusted from one suspension strut to another by using bumpers of different heights and/or by using rigid rings of different heights. However, the preferred arrangement is to use bumpers and rigid rings of a substantially fixed height and simply use spacers of different heights should it be necessary to change the limit of the rebound stroke movement.

Figure 3:
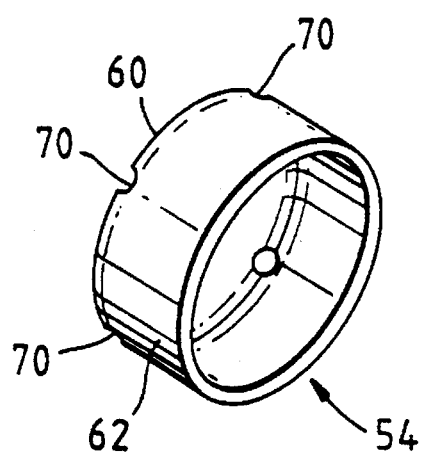
FIG. 3 is a perspective view of the rigid ring of the rebound stop of FIG. 2.
Figure 4:
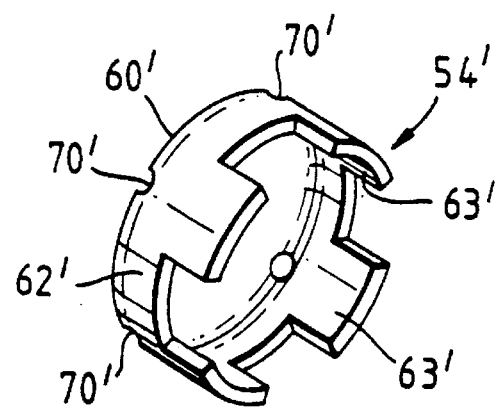
FIG. 4 is a perspective view of an alternative embodiment of rigid ring.

In the present embodiment, the rigid ring 54 is substantially cup-shaped with the wall portion 62 being substantially continuous and extending around the outer circumferential edge of the base portion 60, as shown in FIG. 3. As an alternative design of rigid ring 54', the wall portion 62' may be defined by a number of arms 63' extending substantially perpendicularly away from the outer circumferential edge of the base portion 60', and being circumferentially spaced apart, as shown in FIG. 4. In either arrangement, the rigid ring 54, 54' is preferably formed of metallic material and formed by stamping. Alternatively, the rigid ring may be formed of any other suitable material, such as molded plastics. As a further alternative, the relative positions of the rigid ring and the bumper may be reversed such that during a rebound stroke the wall portion is engageable with the rod guide and the bumper is engageable with the piston.

What is claimed is:

1. A suspension strut comprising:

a tube;

a rod guide closing the tube;

a piston assembly slidably mounted in the tube;

a piston rod attached to the piston assembly and extending through the rod guide; and a rebound stop mounted on the piston rod including a bumper and a substantially rigid ring positioned between the bumper and the piston assembly having a base with a central opening wherein the piston rod is slidable through the central opening and the rebound stop includes an integral annular wall wherein the bumper is engageable with the rod guide and the annular wall is engageable with the piston assembly to limit movement of the piston assembly relative to the tube such that rebound forces pass through the bumper and substantially rigid ring directly to the piston.

2. A suspension strut as claimed in claim 1 wherein the integral annular wall includes a plurality of arms extending substantially perpendicularly from the base.

3. A suspension strut as claimed in claim 2 wherein the base has an outer circumferential edge and the plurality of arms extend from the outer circumferential edge the arms being circumferentially spaced apart.

4. A suspension strut comprising a tube substantially closed at both ends and containing fluid; a piston assembly slidably mounted in the tube and making a sealing fit therewith, the piston assembly separating a compression chamber and a rebound chamber within the tube; a piston rod attached to the piston assembly and extending through the rebound chamber and out of one end of the tube; and a rebound stop slidably mounted on the piston rod between the piston assembly and said one end of the tube, the rebound stop comprising a substantially rigid ring and an annular bumper, wherein the rebound stop is engageable with said one end of the tube and with the piston assembly limiting rebound movement of the piston assembly relative to the tube such that rebound forces pass through the annular bumper and the rigid ring directly to the piston assembly.

5. A suspension strut as claimed in claim 4, wherein the rigid ring is substantially U-shaped in cross-section and comprises an annular base portion and an integral annular wall portion, the annular base portion being positioned nearest the bumper, and the annular wall portion extending away from the bumper.

6. A suspension strut as claimed in claim 5, wherein the rigid ring is substantially cup-shaped with the wall portion extending around the whole of the outer circumferential edge of the base portion.

7. A suspension strut as claimed in claims 4, 5 or 6, wherein the rigid ring comprises a plurality of apertures through which fluid can flow.

8. A suspension strut as claimed in claims 4, 5 or 6, wherein the rebound stop further comprises an annular spacer positioned between the rigid ring and the bumper.

9. A suspension strut as claimed in claims 4, 5 or 6, wherein the rigid ring is formed of metallic material.

10. A suspension strut as claimed in claims 4, 5 or 6, wherein the rigid ring is positioned on the piston assembly side of the rebound stop and the bumper is positioned on the side of the rebound stop directed towards the said one end of the tube.

* * * * *